United States Patent Office

3,565,793
Patented Feb. 23, 1971

3,565,793
DESULFURIZATION WITH A CATALYTIC OXIDATION STEP
Sheldon Herbstman, Spring Valley, and Frank E. Guptill, Jr., Reese A. Peck, and Raymond F. Wilson, Fishkill, N.Y., assignors to Texaco Inc., New York, N.Y., a corporation of Delaware
No Drawing. Filed Dec. 27, 1968, Ser. No. 787,568
Int. Cl. C10g *19/02, 27/04, 31/14*
U.S. Cl. 208—208                                    15 Claims

ABSTRACT OF THE DISCLOSURE

A desulfurization process for the removal of sulfur in a sulfur containing hydrocarbon oil by contacting the sulfur containing hydrocarbon oil with an organic hydroperoxide, an organic peroxide or an organic peracid oxidant in the presence of a Group IV–B, Group V–B or Group VI–B metal followed by sulfur reduction utilizing for example base treatment, a thermal treatment or a hydrodesulfurization treatment.

---

This invention relates to the desulfurization of a hydrocarbon material and more particularly to the desulfurization of hydrocarbon materials of petroleum origin and in particular petroleum fractions of higher molecular weight.

In the past, numerous processes have been employed either to eliminate undesirable sulfur compounds or to convert them into more innocuous forms. One type of process involves physical extraction with a liquid such as sulfuric acid, sulfur dioxide or furfural. Another type of process removes the sulfur compounds by adsorption on suitable materials, for example activated bauxite, activated charcoal or an activated clay. A further type of porcess converts objectionable forms of sulfur compounds, such as mercaptans, into less harmful forms, such as disulfides and polysulfides by various chemical treatments, for example plumbite treatments, hydrochlorite treatments and copper chloride treatments. The above processes are particularly used for the treatment of gasoline fractions. With feedstocks of high molecular weight, a large proportion of the material is in the form of molecules containing at least one sulfur atom, including thiophene sulfur and, particularly, in selective separation processes, would be removed only to a limited extent and with consequent low product yield.

In addition to the above methods for the desulfurization of a hydrocarbon material, desulfurization of hydrocarbon materials has been attempted utilizing oxidation with oxygen as an oxidant followed by thermal treatment to remove sulfur from the oxidized material. The problem that arises utilizing the prior art methods is that heavy hydrocarbon materials such as vacuum residues contain sulfur in the form of thiophene sulfur which type of sulfur is particularly difficult to remove from such hydrocarbon material. In addition, the air oxidation of a sulfur containing hydrocarbon material is not selective towards sulfur oxidation of the hydrocarbon materials, and the formation of ketones and acids occurs. A particular problem that can occur utilizing an oxidation step is the necessity of obtaining a catalyst which will promote the effectiveness of an oxidant while not substantially affecting adversely the overall product quality of the hydrocarbon material. Thus, certain catalysts promote non-selective oxidation or give relatively little increase in oxidation rates when combined with an oxidant.

Additional disadvantages of the prior art methods are the high product losses which can occur using for example an air oxidation process as well as the length of time that is needed in order to effect even minimum sulfur removal. As is apparent from the foregoing there exists the problems in a desulfurization process of obtaining low product losses, high percent sulfur reduction and in the case of an oxidation process selectively as to what material is oxidized.

It is therefore an object of this invention to increase the desulfurization of a hydrocarbon material at low product losses.

It has now been found that desulfurization of a hydrocarbon material can be accomplished by contacting a sulfur containing hydrocarbon material with an oxidant selected from the group consisting of an organic hydroperoxide, an organic peroxide, an organic peracid and mixtures thereof in the presence of a metal catalyst selected from the group consisting of a Group IV–B metal, a Group V–B metal, a Group VI–B metal and mixtures thereof and reducing the sulfur content of the hydrocarbon material utilizing a sulfur reducing process step. Thus it has been found that the use of a Group IV–B, a Group V–B and a Group VI–B metal catalyst or mixtures thereof (hereinafter referred to as catalyst) in conjunction with an organic peroxide, an organic hydroperoxide or an organic peracid or mixtures thereof (hereinafter referred to as oxidant) provides selectivity in oxidation of sulfur, that is, undesirable oxidation products are not formed to any substantial degree. In addition, high product yields of hydrocarbon material (e.g. low product losses) are obtained after removal of sulfur using a sulfur reduction process step. By the use of the term "mixtures thereof" when referring to both the catalyst and oxidant refers to the use of one or more metals or oxidants within the particular group as well as to combinations of different metals and different oxidants within two or more groups. Thus, mixtures thereof refers to the use of two different metals within for example, Group IV–B as well as to the use of such metal with a Group V–B metal and to the use of two different organic peroxides as well as the use of an organic peroxide with an organic hydroperoxide. By the term desulfurization process is meant the process of treating a sulfur containing hydrocarbon material with an oxidant in the presence of a metal catalyst in conjunction with the process step of sulfur reduction. The sulfur reduction process step can be by way of example a base treatment process, a thermal treatment process, a solvent refining process or a hydrodesulfurization process. Thus the use of certain metal catalysts with an oxidant promotes the oxidation of sulfur in a hydrocarbon material whereby selectivity is accomplished without appreciably lowering product yield. A particularly preferred embodiment of this invention is the use of the oxidation step in combination with either a base treatment process or a thermal treatment process. These processes are preferred since it has been discovered that these two processes are capable of effecting excellent sulfur removal and reduction in combination with the oxidation step with minimum losses of reduced sulfur containing hydrocarbon material.

In general the process of this invention is practiced by contacting the sulfur containing hydrocarbon material with an oxidant (e.g. an oxidizing amount) in the presence of a metal catalyst for a time sufficient to effect oxidation of at least a portion of the sulfur present in the hydrocarbon material, generally, from about ½ hour to about 24 hours. The catalyst is used at a concentration which is sufficient to promote the effectiveness of the oxidant. In general, however, it is preferred to use a catalyst concentration varying from about 0.0001 to about 10 wt. percent based upon the weight of the sulfur containing hydrocarbon oil and still more preferably from about 0.10 wt. percent to about 10 wt. percent. The concentration of oxidant is usually dependent upon the weight percent sulfur present in the hydrocarbon material and in general the mole ratio of oxidant to sulfur is from about 0.2 to about 10 moles of oxidant per mole of sulfur, more preferably from about 1 to about 8 moles of oxidant per mole of sulfur and still more preferably from about 1.5 to about 5 moles of oxidant per mole of sulfur. The temperature utilized in carrying out the oxidation step can vary over a wide range and in general is from about 28° F. to about 450° F. preferably from about 50° F. to about 300° F. The process of this invention in general is carried out at atmospheric pressure although pressures up to about 100 atmospheres or higher can be utilized.

The oxidation step as set forth above can optionally include a stripping of the hydrocarbon material with a gas such as carbon dioxide, or nitrogen. This stripping step can accompany the oxidation step or can follow the oxidation step prior to the sulfur reducing step.

Many types of apparatus are suitable for carrying out the reaction including rocking autoclave, mechanically stirred tanks, etc. The reactions can be carried out batchwise, semi-continuously or continuously.

In carrying out the process of this invention a sulfur reduction step is utilized in combination with the oxidation step. A brief description of the preferred sulfur reduction step that is the base treatment process and thermal treatment process are illustrated below together with a hydrodesulfurization step which can in addition be utilized.

In the base treatment step the oxidized sulfur containing hydrocarbon material is contacted with a base preferably an alkali metal hydroxide for a time sufficient to reduce the sulfur content of the hydrocarbon material, generally for about 10 minutes to about 24 hours, preferably from about 1 hour to about 6 hours. The reaction temperature is generally from about 300° F. to about 900° F., preferably from about 400° F. to about 750° F. In addition, pressures above atmospheric can be utilized in carrying out the base treatment. Thus, for example pressures up to 100 atmospheres can be utilized in carrying out the base treatment. In general, it is preferred to use an alkali metal hydroxide preferably potassium or sodium hydroxide although an alkaline earth metal hydroxides or oxides, calcined dolomitic materials and alkalized aluminas can be utilized in carrying out the base treatment. In addition mixtures of different bases can be utilized. In general, an aqueous solution of the base hydroxide at a concentration on a mole basis of generally from about 1 mole of base to 1 mole of sulfur up to about 4 moles of base per mole of sulfur is utilized.

In the thermal treatment step, sulfur reduction is accomplished by treating the oxidized sulfur at temperatures above 300° F., preferably above 500° F. and particularly in the temperature range of from about 550° F. to about 900° F. for a period sufficient to ensure that substantially all the sulfur gaseous decomposition products are removed. This period in general is within the range of about ½ to 10 hours, preferably between about ½ and 5 hours. Under these conditions, the oxidized sulfur compounds are decomposed and the sulfur is liberated mainly as $SO_2$ although at higher temperatures in the region of 550° F. and over, increasing quantities of $H_2S$ are also liberated. The thermal decomposition step may be carried out in the presence of suitable promoting materials comprising porous solids having acidic or basic properties for example, ferric oxide on alumina, bauxite, thoria on pumice, silica alumina, soda-lime and acid sodium phosphate on carbon. Preferably, in the thermal, decomposition step, a small quantity of an inert carrier gas, for example nitrogen, is passed through the reaction mixture to avoid local overheating and also to remove the gaseous sulfur decomposition products.

The catalytic hydrodesulfurization stage may be carried out under relatively mild conditions in a fixed, moving, fluidized or ebullating bed of catalyst. Preferably a fixed bed of catalyst is used under conditions such that relatively long periods elapse before regeneration becomes necessary, for example a temperature within the range of from about 500 to about 900° F. preferably from about 650 to about 800° F., and at a pressure within the range of from about 100 to about 2300 p.s.i.g.

A particularly preferred pressure range within which the hydrodesulfurization step provides extremely good sulfur removal while minimizing the amount of pressure and hydrogen required for the hydrodesulfurization step are pressures within the range of 300 to 800 p.s.i.g. more preferably from about 400 to 600 p.s.i.g.

This invention contemplates the treatment of various type hydrocarbon materials, especially hydrocarbon oils of petroleum origin which contain sulfur. In general, the sulfur content of the oils are in excess of 1%. A particular problem that is encountered in heavy hydrocarbon oils is the presence of thiophene sulfur. Thus it has been found that hydrocarbon oils containing thiophene sulfur are extremely difficult to process as to sulfur reduction utilizing the prior art methods. The use of more drastic conditions utilizing the prior art methods such as air oxidation brings about many problems such as extensive oxidation of the hydrocarbon oil and the formation of extensive amounts of resinous material and coke. The process of this invention is particularly applicable to reducing the sulfur content of hydrocarbon oils which contain thiophene sulfur. Typical examples of hydrocarbon oils which are particularly adaptable to the process of this invention are those petroleum fractions containing at least a major amount of material boiling above 550° F. for example, crude oil and atmospheric and vacuum residues which contain usually 1% by weight or more of sulfur. Additional examples of hydrocarbon oils to which the present invention may be usefully applied are cracked gas oils, residual fuel oils, topped or reduced crudes, crude petroleum from which the lighter fractions are absent, vacuum residues, residues from cracking processes, oils from tar sands and oil shale. The invention is especially applicable to such of these and other like materials as cannot be deeply flashed without extensive carry over of sulfur containing compounds. In general the thiophene containing materials which are found in the hydrocarbon oils which are extremely difficult to remove are by way of example tetraphenylthiophene, diacenaphtho[1,2 - b,1', 2'-d]thiophene and anthra[2,1,9-cde]thianaphthene.

The oxidants which are utilized in carrying out the process of this invention are selected from organic peroxides, organic hydroperoxides and organic peracids. These oxidants, include by way of example hydrocarbon peroxides, hydrocarbon hydroperoxides and hydrocarbon peracids wherein the hydrocarbon radicals in general contains from about 1 to about 30 carbon atoms per peroxide linkage. With respect to the hydrocarbon peroxides and hydrocarbon hydroperoxides, it is particularly preferred that such hydrocarbon radical contain from 4 to 18 carbon atoms per peroxide linkage and more particularly from 4 to 16 carbon atoms per peroxide linkage. With respect to the hydrocarbon peracids the hydrocarbon radical is defined as that radical which is attached to the carbonyl carbon and in general such hydrocarbon radical can be from 1 to about 12 carbon atoms more preferably from about 1 to about 8 carbon atoms. It is intended that the term organic peracid includes by way of definition performic acid wherein hydrogen is attached to the carbonyl carbon. A particularly preferred embodiment of this invention is the use of organic hydroperoxides and organic peroxides in combination with the metal containing catalyst. Thus it has been found that the organic hydroperoxides and peroxides are promoted selectively in combination with these metal catalysts. The particularly preferred oxidants are the organic hydroperoxides preferably tertiary butyl hydroperoxide and cumene hydroperoxide.

In addition it is contemplated within the scope of this invention that the organic oxidants can be prepared in situ, that is the peroxide, hydroperoxide or peracid can be generated in the sulfur containing heavy hydrocarbon fraction and such organic oxidant is contemplated for use within the scope of this invention.

Typical examples of hydrocarbon radicals are alkyl such as methyl, ethyl, butyl, t-butyl, pentyl, n-octyl and those aliphatic radicals which represent the hydrocarbon portion of a middle distillate or kerosene, cycloalkyl radicals such as cyclopentyl, alkylated cycloalkyl radicals such as mono- and polymethylcyclo-pentyl radicals, aryl and cycloalkyl substituted alkyl radicals such as phenyl and alkyl phenyl substituted alkyl radicals examples of which are benzyl, methylbenzyl, caprylbenzyl, phenylethyl, phenylpropyl, naphthylmethyl, naphthylethyl, aryl radicals such as phenyl, and naphthyl, alkaryl radicals such as xylyl, alkylphenyl, and ethylphenyl.

Typical examples of oxidants are hydroxyheptyl peroxide, cyclohexanone peroxide, t-butyl peracetate, di-t-butyl diperphthalate, t-butyl-perbenzoate, methyl ethyl ketone peroxide, dicumyl peroxide, t-butyl hydroperoxide, di-t-butyl peroxide, p-menthane hydroperoxide, pinane hydroperoxide, 2,5 - dimethylhexane - 2,5 - dihydroperoxide and cumene hydroperoxide, organic peracids, such as performic acid, peracetic acid, trichloroperacetic acid, perbenzoic acid and perphthalic acid.

The catalyst which is utilized to promote the oxidation of sulfur using the preferred oxidants are catalyst selected from Group IV–B, Group V–B and Group VI–B metals. These catalyst can be incorporated into the oxidation system by any means known to those skilled in the art, and can be either a homogeneous or heterogeneous catalyst system. The catalyst can be incorporated by a variety of means and by the use of a variety of carriers. The particular catalyst carrier which is utilized is not critical with respect to the practice of this invention and can be for example, a support medium or an anion (including complex formation) which is attached to the metal (e.g. a ligand). The particularly preferred catalyst metals are titanium, zirconium, chromium, molybdenum and tungsten. Illustrative ligands include halides, organic acids, alcoholates, mercaptides, sulfonates and phenolates. These metals may be also bound by a variety of complexing agents including acetyl acetonates, amines, ammonia, carbon monoxide and olefins, amongst others. The metals may also be introduced in the form or organometallics including "ferrocene" type structures. The various ligands illustrated above which are utilized solely as carriers to incorporate the metal into the process system, in general have an organic radical attached to a functional group such as the oxygen atom of carbonyloxy group of the acid, the oxygen of the alcohol, the sulfur of the mercaptan, the

of the sulfonate, the oxygen of the phenolic compound and the nitrogen of the amines. The organic radical attached to the aforedescribed functional groups can be defined as a hydrocarbon radical and in general can contain from 1 to about 30 carbon atoms. Typical examples of hydrocarbon radicals are set forth above.

The metals contained on the heterogeneous catalyst can include individual or combinations of metals. These metals can be suspended on a suitable material, for example alumina, silica (or combinations of both) as well as activated clays or carbon, amongst others. The modes of contacting whereby the catalytic effect may be achieved may include slurry-bed reactions or continuous contacting over a stationary phase in a trickle-tube reactor. The particularly preferred catalyst for carrying out the oxidation step of the process of this invention is molybdenum such as in the form of molybdenum hexacarbonyl.

The invention can be better appreciated by the following non-limiting examples.

EXAMPLE 1

To a 2 liter reaction flask equipped with stirrer and heating means is charged 1000 grams of atmospheric reduced Arabian crude 550° F.+ (2.7 wt. percent sulfur) and 5 grams of molybdenum hexacarbonyl dissolved in 1000 milliliters of benzene. The reaction mixture is heated to 190° F. and 148 grams of 90% by weight tert-butyl hydroperoxide is added over a one hour period. The reaction mixture is maintained at a temperature of 190° F. for 8 hours after which light ends are removed under vacuum at 220° F. and 10 mm./Hg for a 2 hour period. The recovery of reduced Arabian crude is 99% by weight.

EXAMPLE 2

To a 2 liter reaction flask equipped with stirrer and heating means is charged 1000 grams of atmospheric reduced Arabian crude 550° F.+ (2.7 wt. percent sulfur) and 0.50 grams of molybdenum hexacarbonyl dissolved in 100 milliliters of benzene. The reaction mixture is heated to 190° F. and 148 grams of 90% tert-butyl hydroperoxide is added over a one hour period. The reaction mixture is maintained at a temperature of 190° F. for 8 hours after which light ends are removed under vacuum at 220° F. and 10 mm./Hg over a 2 hour period. The recovery of reduced Arabian crude is 99% by weight.

EXAMPLE 3

To a 2 liter reaction flask equipped with stirrer and heating means is charged 1000 grams of atmospheric reduced Arabian crude 550° F.+ (2.7 wt. percent sulfur) and 5 grams of molybdenum hexacarbonyl dissolved in 100 milliliters of benzene. The reaction mixture is heated to 190° F. and 300 grams of cumene hydroperoxide is added over a one hour period. The reaction mixture is maintained at a temperature of 198° F. for 6 hours after which light ends are removed under vacuum at 220° F. and 10 mm./Hg over a 2 hour period. The recovery of reduced Arabian crude is 99% by weight.

EXAMPLE 4

To a 2 liter reaction flask equipped with stirrer and heating means is charged 1000 grams of atmospheric reduced Arabian crude 550° F.+ (2.7 wt. percent sulfur) and 2.0 grams of vanadium acetyl acetonate dissolved in 100 milliliters of benzene. The reaction mixture is heated to 190° F. and 148 grams of 90% tert-butyl hydroperoxide is added over a one hour period. The reaction mixture is maintained at a temperature of 190° F. for 8 hours after which light ends are removed under vacuum at 220° F. and 10 mm./Hg over a 2 hour period. The recovery of reduced Arabian crude is 99% by weight.

EXAMPLE 5

To a 2 liter reaction flask equipped with stirrer and heating means is charged 1000 grams of atmospheric reduced Arabian crude 550° F.+ (2.7 wt. percent sulfur) The reaction mixture is heated to 190° F. and 149 grams of 90% tert-butyl hydroperoxide is added over a one hour period. The reaction mixture is maintained at 190° F. for 8 hours after which light ends are removed under vacuum at 220° F. and 10 mm./Hg over a 2 hour period. The recovery of reduced Arabian crude is 99% by weight.

EXAMPLE 6

To a 2 liter reaction flask equipped with stirrer and heating means is charged 1000 grams of atmospheric reduced Arabian crude 550° F.+ (2.7 wt. percent sulfur) and 12% molybdenum oxide on activated alumina (⅜" extrusions). The reaction mixture is heated to 190° F. and 148 grams of 90% tert-butyl hydroperoxide is added over a one hour period. The reaction mixture is maintained at a temperature of 190° F. for 8 hours after which light ends are removed under vacuum at 220° F. and 10 mm./Hg over a 2 hour period. The recovery of reduced Arabian crude is 99% by weight.

EXAMPLE 7

To a 2 liter reaction flask equipped with stirrer and heating means is charged 1000 grams of atmospheric reduced Arabian crude 550° F.+ (2.7 wt. percent sulfur) and 100 grams of 11% vanadium oxide on activated clay (3/16″ extrusions). The reaction mixture is heated to 190° F. and 148 grams of 90% tert-butyl hydroperoxide is added over a one hour period. The reaction mixture is maintained at 190° F. for 8 hours after which light ends are removed under vacuum at 220° F. and 10 mm./Hg over a 2 hour period. The recovery of reduced Arabian crude is 99% by weight.

EXAMPLE 8

Example 1 is repeated using 4 moles (296 grams) of 90% by wt. tert-butyl hydroperoxide. The recovery of reduced Arabian crude is 98% by wt.

EXAMPLE 9

Example 1 is repeated using a 650° F.+ atmospheric reduced Arabian crude (2.6% sulfur by wt.) instead of the 550° F.+ reduced Arabian crude. The recovery of reduced Arabian crude is 99% by wt.

EXAMPLE 10

Example 5 is repeated utilizing a 650° F.+ atmospheric reduced Arabian crude (2.6 wt. percent sulfur) in place of the 550° F.+ reduced Arabian crude.

hour is maintained for 7 hours at a temperature of 300° F. The temperature is then reduced to ambient temperature.

EXAMPLE 15

Example 13 is repeated using vanadium acetylacetonate as the catalyst in place of molybdenum hexacarbonyl. The catalyst is used at a concentration of 300 parts per million, and an oxygen rate of 0.3 cubic feet per hour is maintained for a period of 7 hours at a temperature of 350° F. The temperature is then reduced to ambient temperature.

The various hydrocarbon materials which are subjected to various oxidation treatments are followed by a desulfurization step. In Table I are listed Examples 16 through 32 wherein various hydrocarbon materials were subjected to either a thermal treatment or base treatment. The thermal treatment referred to in Table I adjacent to desulfurization step are carried out utilizing conventional process pressure equipment. In the case of the thermal treatment step 1000 grams of the hydrocarbon material which was subject to an oxidation step is charged to a reactor and heated to a given temperature for a given period of time. In the base treatment step the base, potassium hydroxide, is added in an aqueous solution to 1,000 grams of the hydrocarbon material which had been subjected to an oxidation step, for a given period of time at a given temperature.

In Table I the letter T indicates that a thermal treatment was used whereas the letter B indicates that a base treatment was used in the desulfurization step.

TABLE I

| Example No. | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|
| Hydrocarbon fraction from Example No. | 1 | 2 | 3 | 4 | 6 | 7 | 5 | 8 | 9 | 3 | 5 | 10 | 11 | 12 | 13 | 14 | 15 |
| Desulfurization step | T | T | T | T | T | T | T | T | B | B | B | B | T | T | T | T | T |
| Desulfurization process conditions: | | | | | | | | | | | | | | | | | |
| Temp., ° F | 750 | 750 | 750 | 750 | 750 | 750 | 750 | 750 | 650 | 650 | 650 | 650 | 750 | 750 | 725 | 725 | 725 |
| Time, hrs. | 4 | 4 | 4 | 4 | 4 | 4 | 4 | 4 | 1.5 | 1.5 | 1.5 | 1.5 | 4 | 4 | 4 | 4 | 4 |
| Grams base | | | | | | | | | 40 | 40 | 40 | 40 | | | | | |
| Recovery, wt. percent | | 90 | 93 | 91 | 91 | 93 | | 97 | 96 | 97 | | | | | | | |
| Product analysis, wt. percent: | | | | | | | | | | | | | | | | | |
| S | 0.91 | 0.90 | 1.40 | 1.24 | 0.93 | 1.36 | 2.17 | 0.68 | 0.87 | 1.10 | 2.10 | 2.30 | | | | | |
| Desulfurization | 65 | 65 | 48 | 53 | 63 | 48 | 17 | 74 | 68 | 59 | 22 | 15 | 12 | 10 | 4 | 7 | 7 |
| N | 0.05 | | 0.06 | | | | | | | | | | | | | | |
| Denitrification | 62 | | 57 | | | | 29 | | | | | | | | | | |

EXAMPLE 11

Example 1 is repeated using 250 grams instead of 1000 grams of 550° F.+ reduced Arabian crude and 50 cc. of 0.6 wt. percent platinum on activated alumina in place of the molybdenum hexacarbonyl catalyst. The mole ratio of tertiary butyl hydroperoxide to sulfur is maintained at 2:1 and a temperature of 190° F. is maintained for a period of 9 hours.

EXAMPLE 12

Example 11 is repeated using 25 grams of nickel chloride in place of the 50 cc. of platinum on activated alumina as the catalyst.

EXAMPLE 13

To a reactor equipped with stirring means, gas addition means and heating means is added 60 grams of atmospheric 550° F.+ reduced Arabian crude (2.7 wt. percent sulfur) together with 670 parts per million of molybdenum hexacarbonyl. The temperature is increased to 220° F. as oxygen at a rate of 0.3 cubic feet per hour is introduced. The oxygen rate and temperature is maintained for a period of three hours. The temperature is reduced to ambient temperature.

EXAMPLE 14

Example 13 is repeated utilizing molybdenum hexacarbonyl plus cobalt octanoate (1000 parts per million total) as a catalyst. The oxygen rate of 0.3 cubic feet per The preceding examples demonstrate the outstanding effectiveness of the combination of oxidant plus catalyst together with a desulfurization step for reducing the sulfur content of various hydrocarbon materials. More particularly the results in Table I demonstrate that the percent desulfurization which is obtained utilizing a catalyst in combination with an oxidant as compared to the use of the oxidant alone is significantly greater for the process of this invention. Thus, a comparison between Examples 16, 17, 24 and 25 and Examples 22, 26 and 27 show percent desulfurization for the catalyzed oxidation step of 65%, 65%, 68% and 59% respectively whereas desulfurizations for the non-catalyzed oxidation step are 17%, 22% and 15% respectively. In addition, the use of air plus catalyst, Examples 30, 31 and 32, showed little or no percent sulfur reductions when combined with a desulfurization step. These results obtained with an air catalyzed oxidation step point up the outstanding effectiveness of the combination of the claimed oxidants plus catalyst in obtaining sulfur reductions when such oxidation is utilized in combination with a desulfurization step. In addition, Examples 28 and 29 demonstrate that catalyst such as platinum or aluminum and nickel chloride which have been used to promote air oxidation are not effective when combined with a peroxide type oxidant. Thus the results obtained in Examples 28 and 29 show a percent desulfurization less than that obtained when the oxidant in the absence of catalyst is utilized although neither oxidation steps are effective when compared to the process of this invention.

We claim:

1. In a desulfurization process wherein a sulfur containing hydrocarbon oil is oxidized with an oxidant and sulfur is then removed by a sulfur reducing step, the improvement which comprises contacting said sulfur containing hydrocarbon oil with a peroxide oxidant selected from the group consisting of an organic hydroperoxide, an organic peroxide, an organic peracid and mixtures thereof and with a catalyst comprising a metal selected from the group consisting of titanium, zirconium, chromium, tungsten and molybdenum and mixtures thereof, said peroxide oxidant being used in an amount of from 0.5 mole to about 8 moles per mole of sulfur present in said hydrocarbon oil.

2. A process of claim 1 wherein the catalyst comprises chromium.

3. A process of claim 1 wherein the catalyst comprises molybdenum.

4. A process of claim 1 wherein the catalyst is molybdenum hexacarbonyl.

5. A process of claim 1 wherein the peroxide oxidant is present in a mole ratio of from about 1.5 moles to about 5 moles of the peroxide oxidant per mole of sulfur present in the sulfur containing hydrocarbon material.

6. A process of claim 1 wherein said sulfur reducing step consists of a thermal treatment or a base treatment.

7. A process of claim 2 wherein said sulfur reducing step consists of a thermal treatment or a base treatment.

8. A process of claim 3 wherein said sulfur reducing step consists of a thermal treatment or a base treatment.

9. A process of claim 5 wherein said sulfur reducing step consists of a thermal treatment or a base treatment.

10. A process of claim 2 wherein the oxidizing amount of the peroxide oxidant is from about 1.5 mole to about 5 moles of peroxide oxidant per mole of sulfur present in said oil, the peroxide oxidant is selected from the group consisting of a hydrocarbon peroxide, a hydrocarbon hydroperoxide, a hydrocarbon peracid, and mixtures thereof wherein each hydrocarbon radical contains from 1 to about 30 carbon atoms and said oil is a reduced crude oil.

11. A process of claim 3 wherein the oxidizing amount of the peroxide oxidant is from about 1.5 mole to about 5 moles of peroxide oxidant per mole of sulfur present in said oil, the peroxide oxidant is selected from the group consisting of a hydrocarbon peroxide, a hydrocarbon hydroperoxide, a hydrocarbon peracid, and mixtures thereof wherein each hydrocarbon radical contains from 1 to about 30 carbon atoms and said oil is a reduced crude oil.

12. A process of claim 4 wherein the oxidizing amount of the peroxide oxidant is from about 1.5 mole to about 5 moles of peroxide oxidant per mole of sulfur present in said oil, the peroxide oxidant is selected from the group consisting of a hydrocarbon peroxide, a hydrocarbon hydroperoxide, a hydrocarbon peracid, and mixtures thereof wherein each hydrocarbon radical contains from 1 to about 30 carbon atoms and said oil is a reduced crude oil.

13. A process of claim 10 wherein each hydrocarbon radical contains from 1 to about 11 carbon atoms.

14. A process of claim 11 wherein each hydrocarbon radical contains from 1 to about 12 carbon atoms.

15. A process of claim 12 wherein the oxidant is selected from the group consisting of tertiary butyl hydroperoxide, cumene hydroperoxide and mixtures thereof.

References Cited

UNITED STATES PATENTS

| | | | |
|---|---|---|---|
| 3,163,593 | 12/1964 | Webster et al. | 208—219 |
| 3,284,342 | 11/1966 | Nathan et al. | 208—208 |
| 3,341,448 | 9/1967 | Ford et al. | 208—208 |

DELBERT E. GANTZ, Primary Examiner

G. J. CRASANAKIS, Assistant Examiner

U.S. Cl. X.R.

208—230, 240

PO-1050
(5/69)

UNITED STATES PATENT OFFICE
CERTIFICATE OF CORRECTION

Patent No. 3,565,793                           Dated February 23, 1971

Inventor(s) SHELDON HERBSTMAN, FRANK E. GUPTILL, JR., REESE A PECK and RAYMOND F. WILSON It is certified that error appears in the above-identified patent and that said Letters Patent are hereby corrected as shown below:

Column 6, line 8, "1000" should read --100--.

Column 8, line 67, "or" should read --on--.

Claim 13, line 2, "11" should read --12--

Signed and sealed this 6th day of July 1971.

(SEAL)
Attest:

EDWARD M. FLETCHER, JR.
Attesting Officer

WILLIAM E. SCHUYLER,
Commissioner of Pater